Inventor
Gotthard V. A. Gustafsson
By Stevens, Davis and Miller
his attorney

Patented July 10, 1951

2,559,919

UNITED STATES PATENT OFFICE 2,559,919

APPARATUS FOR MEASURING FORCES, ESPECIALLY THE FORCE OF GRAVITY

Gotthard V. A. Gustafsson, Hoglandstorget, Sweden, assignor to Bolidens Gruvaktiebolag, Skelleftehamn, Sweden, a joint-stock company limited of Sweden Application April 3, 1948, Serial No. 18,805
In Sweden April 3, 1947

1 Claim. (Cl. 73—382)

This invention relates to an apparatus for measuring forces, especially the force of gravity, such as an apparatus for weighing and particularly an analytical scale.

In known scales of this kind there have been difficulties to obtain a sufficient sensibility especially for weighing extremely small quantities. In this case it is most important to compensate the force of gravity acting on the movable system of the scales in such a way that the spring constant, i. e. force per unit displacement, obtains a low value.

In this invention this is made possible by using a system of permanent magnets arranged in a certain way.

Scales using magnet arrangements have been previously proposed but they have not proved to be useful. In one of these scales the displacement obtained is not directly proportioned to the force but to the cubic root of the force.

This invention has for its object a weighing apparatus having a movable weighing system and an indicating device in which said movable weighing system is supported through force action between a horizontal permanent magnet attached to said system and two other permanent magnets attached to a frame and arranged on each side of the first mentioned permanent magnet in a plane comprising the said magnet while moving, the poles of the lowermost magnet being directed in the same direction as the poles of the intermediate magnet and the poles of the uppermost magnet being directed in the opposite direction as the poles of the intermediate magnet.

Other objects of the invention will be apparent from the following detailed description.

In the accompanying drawings some examples of embodiment of the invention are illustrated.

Figure 1:
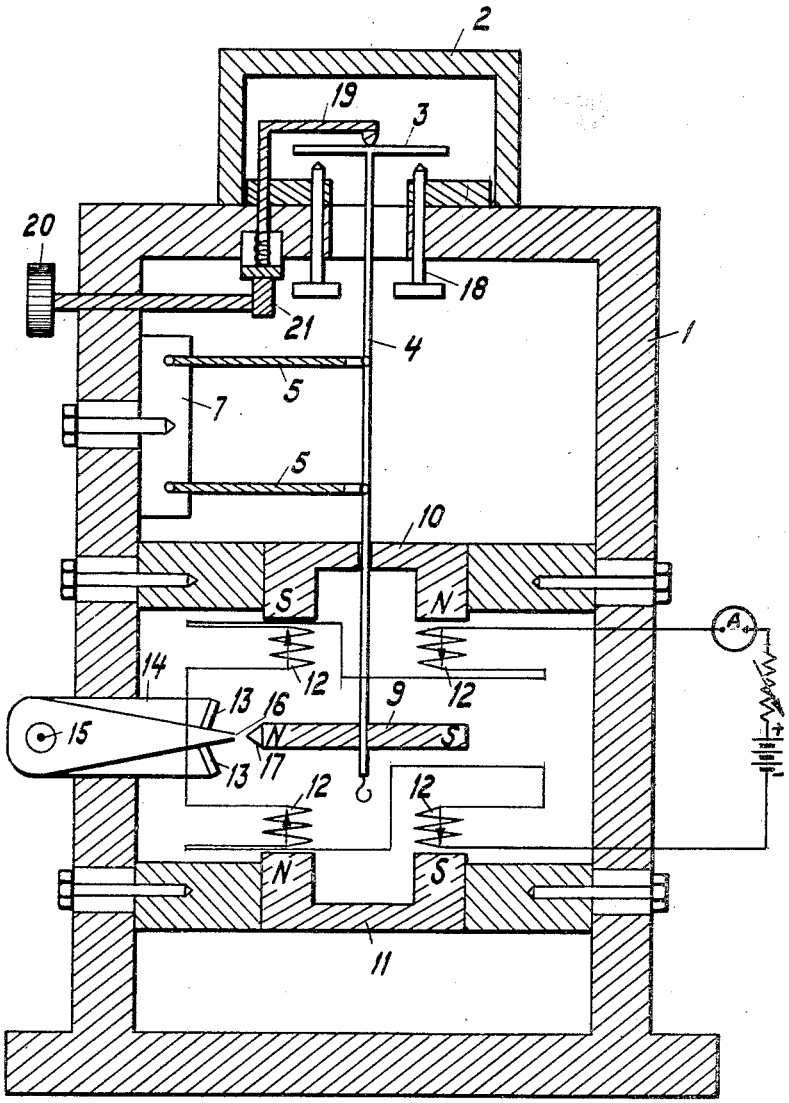
Fig. 1 is a longitudinal section through a weighing apparatus for analytical purposes constructed in accordance with the invention.
Figure 2:
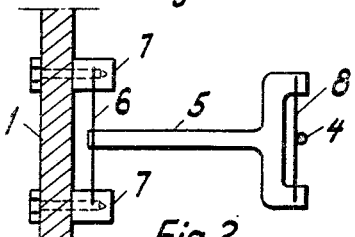
Fig. 2 is a plan view in detail showing the guiding means for the movable system shown in Fig. 1.

Referring to Figs. 1 and 2, 1 indicates a frame in form of a casing and 2 a removable part of this. The pan 3 designed to receive the load is supported by a vertical bar 4 which is parallel guided by suitable means. As shown in the drawings (Fig. 2) this may comprise two rods or plates 5. At one end of said rods there is attached a torsion bar 6, the ends of which are fixed by bolts to two brackets 7 fixed to or integral with the frame. The other ends of the rods 5 are forked and other torsion bars 8 are fastened between the teeth of the fork. The vertical bar 4 is then secured to the torsion bars 8.

A permanent magnet 9 is fastened horizontally to the lower end of the bar 4. In the drawing the magnet 9 is shown as a bar magnet with its north pole at the left and its south pole at the right of Fig. 1. Above the magnet 6 another permanent magnet 10 is fastened to the frame 1 suitably in such a way that the position of the magnet can be adjusted. The vertical bar 4 is freely movable through a clearance boring in the magnet 10. The north pole of the magnet 10 is placed above the south pole of the magnet 9 fastened to the vertical bar 4 and the south pole of the magnet 10 is placed above the north pole of the magnet 9. Below the magnet 9 another permanent magnet 11 is fastened to the frame 1 suitably in a similar way as the magnet 10. The south pole of said magnet 11 is placed below the south pole of the magnet 9 and the north pole of the magnet 11 below the north pole of the magnet 9. In the drawing the poles of said permanent magnets are indicated N for north pole and S for south pole.

As will be understood the uppermost magnet 10 will attract the intermediate magnet 9 while the lowermost magnet 11 repels the magnet 9. Thus the magnets 10 and 11 fastened to the frame will support the movable weighing system comprising the magnet 9, the vertical bar 4 and the pan 3.

Attached to the four poles of the magnets 10 and 11 or to the frame 1 there are four coils 12. The coils can be fed with electric current from a suitable source such as a battery shown diagrammatically in Figure 1 and the current varied by any suitable means such as a variable resistor shown in Figure 1. The ammeter appropriately indicated in this figure measures the current flowing through the coils 12.

An arrangement is provided for indicating a predetermined position of the movable system or for measuring a displacement of said system from said predetermined position. For this purpose any suitable device can be used. Such devices are well known and do not need any detailed description. In the drawings there is shown such a device comprising two photocells 13 coupled in a differential electric circuit (not shown). The photocells are fixed to a casing 14 adjustably attached to the frame 1. In said casing 14 a light source 15 is mounted to project a light beam through a slit 16 formed in the inner end of the casing 14. On the movable system, for example one side of the magnet 9 there is mounted a wedge-shaped mirror 17, by which the light from the slit 16 is reflected onto the photocells 13.

Suitably the movable system 3, 4 and 9 is provided with a locking device for example comprising three adjustable supports such as screws 18 placed below the pan 3 and a lock arm 19 above the pan 3. By rotating a hand wheel 20 secured to a shaft mounted in the frame and provided with an eccentric sheave 21, said arm 19 can be lowered or raised for locking or unlocking respectively the movable system.

Attached to the movable system there may be a means such as a hook, for receiving pieces of known weights for calibrating the apparatus.

Weighing by means of the present apparatus is performed in the following way.

Before weighing, the magnets 10 and 11 are adjusted to set the movable system into the position predetermined by the indicating device 13 to 17. By varying the positions of the magnets 10 and 11 in relation to the magnet 9 also the sensibility of the scales can be adjusted in any desired degree.

The scales is then calibrated by means of said pieces of known weights.

The load to be weighed is placed on the pan 3. The movable system will now sink a distance, which is substantially directly proportional to the weight of the load. Said displacement of the system may be used for measuring the weight of the load in several ways. Thus the displacement can be measured by the indicating device 13 to 17 which directly gives the weight of the load. Another way is to use the coils 12 for restoring the system to the predetermined position and to measure the actual current through the coils, which of course are arranged in an analogous way as the magnets 10 and 11. A third method of weighing is to restore the system to the predetermined position by displacing one or both of the magnets 10 and 11 and to measure the displacement, which gives directly the weight of the load.

Figure 3:
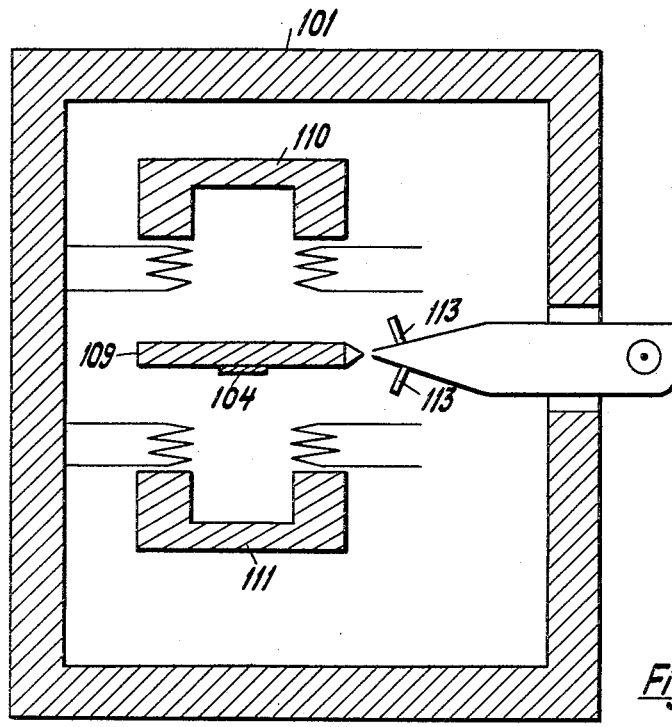
Fig. 3 is a longitudinal section of another form of a weighing apparatus according to the invention.
Figure 4:
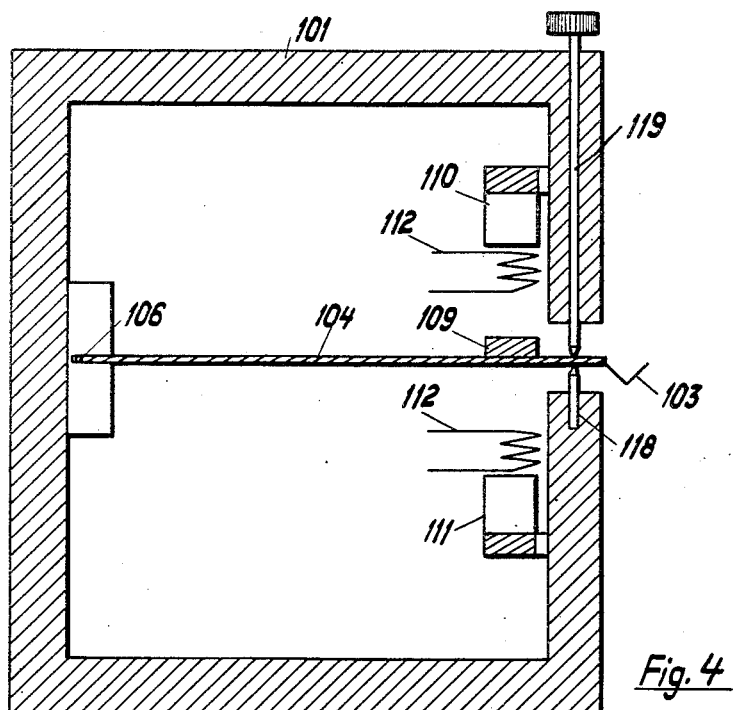
Fig. 4 is a longitudinal section taken at 90° with respect to Fig. 3.

The embodiment shown in Figs. 3 and 4 is principally the same as the one shown in Figs. 1 and 2. Corresponding reference numerals have been employed in Figs. 3 and 4 with the exception that the number 100 has been added to the reference numerals of Figs. 1 and 2.

The load to be weighed is placed in a pan 103 which is suspended at one end of a substantially horizontal bar 104 corresponding to the vertical bar 4 of Fig. 1. The bar 104 is not parallel guided as the bar 4, but the other end of the bar is secured to a torsional bar 106 fastened to the frame 101. The torsional bar 106 may be substituted by a leaf spring. Adjacent to the end of the bar 104 at which the pan is mounted a magnet system 109, 110 and 111 is arranged in the same way as shown in Fig. 1. The apparatus may be provided with a suitable device 118, 119 for limiting the play of the bar 104 and for locking same.

The weighing procedure is analogous to that described in connection with Fig. 1.

In the embodiments described four coils have been shown for restoring the movable system, but it is to be understood that any number of coils may be used.

The apparatus described above has been intended for weighing purposes, but it can without changes be used for measuring gravity and forces of any kind and direction.

In case the load to be weighed contains magnetic material it may be advisable to shield the pan from the rest of the apparatus which can be done in any known manner.

In case the strengths of the fields from the permanent magnets change this can be compensated by adjusting the positions of the magnets attached to the frame.

The accuracy of the apparatus is extremely good. Thus in tests performed with a model of the apparatus an accuracy of 1 microgram has been attained without difficulties.

While various specific embodiments of the present invention have been described above, it will be apparent that many changes and modifications may be made in the apparatus and in the procedures herein described without departing from the spirit of the invention. It is therefore to be understood that the particular apparatus and procedures set forth above are intended to be illustrative only and are not intended to limit the scope of the invention as defined in the following claim.

What I claim is:

Apparatus for measuring forces especially the force of gravity comprising a movable system, a permanent magnet attached to said system, two permanent magnets attached to a frame and arranged on opposite sides to said magnet in a plane comprising said magnet while moving, the poles of one of said two magnets being directed in the same direction and the other in the opposite direction as the poles of the intermediate magnet, means for indicating the position of said movable system, means for guiding said movable system, means for applying to said system the force to be measured, a number of coils for restoring the movable system to a predetermined position after the application of the force to the system, said coils being arranged in front of the poles of the magnets attached to the frame and adapted to be fed with electric current and means for measuring said current.

GOTTHARD V. A. GUSTAFSSON.

REFERENCES CITED

The following references are of record in the file of this patent:

UNITED STATES PATENTS

| Number | Name | Date |
| --- | --- | --- |
| 1,746,627 | Babbitt | Feb. 11, 1930 |
| 2,148,523 | Baermann | Feb. 28, 1939 |
| 2,183,115 | Boucher | Dec. 12, 1939 |
| 2,279,076 | Sutton | Apr. 7, 1942 |
| 2,291,628 | Ising | Aug. 4, 1942 |

FOREIGN PATENTS

| Number | Country | Date |
| --- | --- | --- |
| 451,817 | Great Britain | Aug. 12, 1936 |